United States Patent [19]

Wagner et al.

[11] Patent Number: 4,988,084
[45] Date of Patent: Jan. 29, 1991

[54] SPRING ELEMENT FOR CONNECTING TWO COMPONENTS WITH ANGLE OF ROTATION MOBILITY

[75] Inventors: Alois Wagner, Emmerkofen; Otmar Friedberger, Neubiberg, both of Fed. Rep. of Germany

[73] Assignee: Messerschmitt-Bölkow-Blohm GmbH, München, Fed. Rep. of Germany

[21] Appl. No.: 383,922

[22] Filed: Jul. 21, 1989

[30] Foreign Application Priority Data

Jul. 21, 1988 [DE] Fed. Rep. of Germany ....... 3824816

[51] Int. Cl.⁵ .............................. B25B 1/00; F16B 7/00
[52] U.S. Cl. ...................................... 267/160; 403/291
[58] Field of Search ............... 267/158, 160, 154, 273; 244/75 A; 416/144, 140 A, 134 A; 403/24, 291

[56] References Cited

U.S. PATENT DOCUMENTS

| | | | |
|---|---|---|---|
| 4,087,203 | 5/1978 | Ferris | 416/134 A |
| 4,179,104 | 12/1979 | Skinner | 267/154 |
| 4,244,677 | 1/1981 | Noehren et al. | 416/134 A |
| 4,273,511 | 6/1981 | Mouille et al. | 416/134 A |
| 4,676,720 | 6/1987 | Niwa et al. | 416/134 A |
| 4,690,616 | 9/1987 | Hahn et al. | 416/134 A |
| 4,778,343 | 10/1988 | Hahn et al. | 416/134 A |
| 4,802,784 | 2/1989 | Brooks | 267/160 X |

FOREIGN PATENT DOCUMENTS 2829605 2/1979 Fed. Rep. of Germany .

Primary Examiner—Robert J. Oberleitner
Attorney, Agent, or Firm—Kenyon & Kenyon

[57] ABSTRACT

A spring element for connecting two components, the two components having substantially the same direction of extension, where one component is fixed relative to the other component, with the latter component having angle of rotation mobility relative to the fixed component. In the component extension direction, a T-shaped sectional piece is provided having a base section extending in the component extension direction and a section extending substantially perpendicularly from the base section. The section extending from the base section has a connecting device for connecting this section to the component with angle of rotation mobility. The base section has torsional flexibility and includes a connecting device at each end for connecting the base section to the fixed component. The connecting devices for connecting the base section to the fixed component are limited to both ends of the base section.

5 Claims, 1 Drawing Sheet

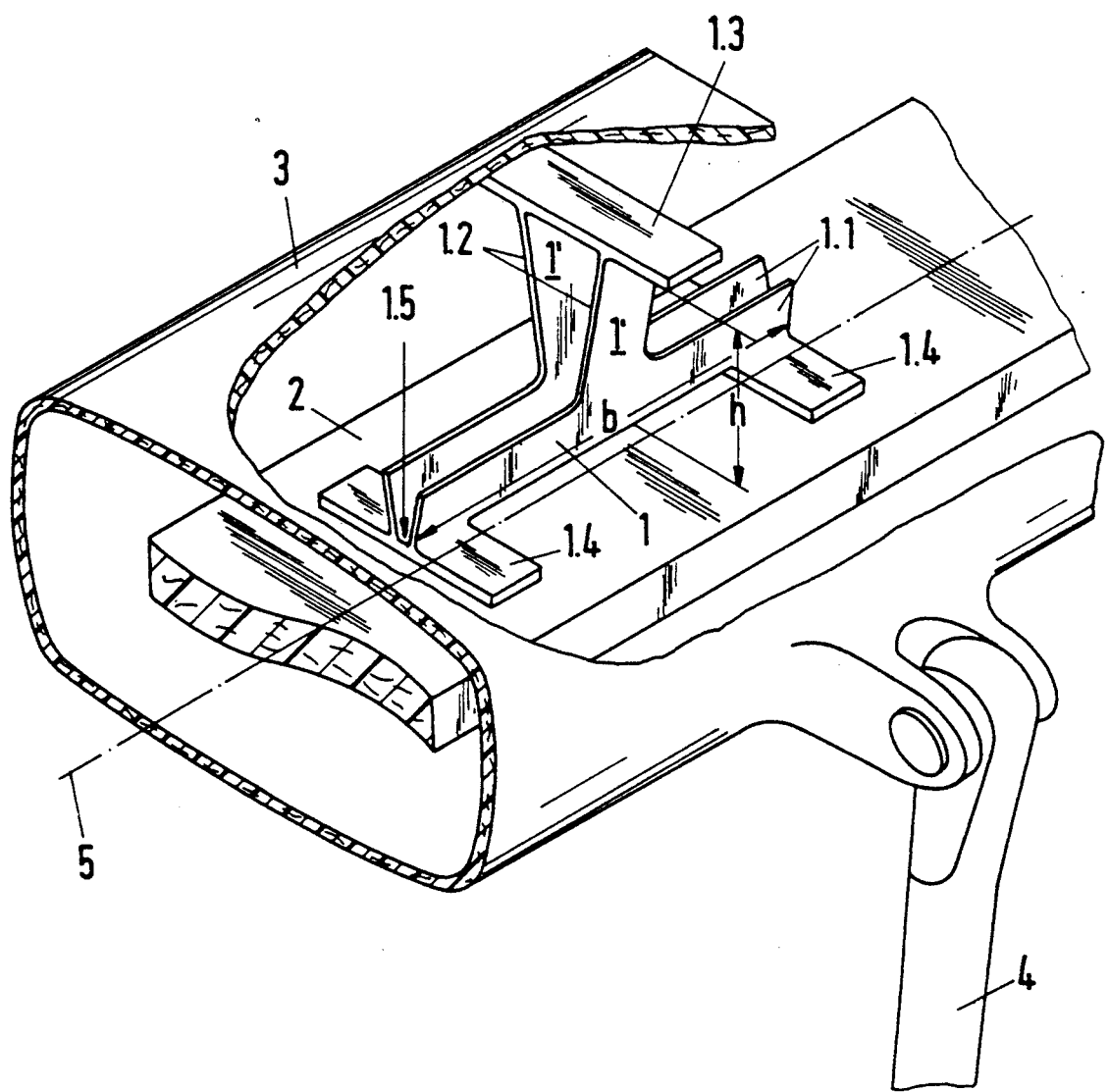

SPRING ELEMENT FOR CONNECTING TWO COMPONENTS WITH ANGLE OF ROTATION MOBILITY

BACKGROUND OF THE INVENTION

The present invention relates to a spring element for connecting two components with angle of rotation mobility.

In the specific embodiment of an elastomer spherical joint in the case of a rotor known from the German Published Pat. application No. 28 29 605, such a spring element functions as a bearing arrangement with angular mobility for a blade control casing of the blade's pitch angle control system for the blade relative to the rotor hub. Thereby, the preferred design with elastomer laminated material represents a considerable portion of the weight of the support for the blade control casing on the hub side, above all when a long-lasting design is required of the articulated bearing.

SUMMARY OF THE INVENTION

It is an object of the present invention to provide a spring element of the type mentioned above, which will enable the one component to be supported with angle of rotation mobility, for example the previously mentioned blade control casing, on this related fixed component, for example on an rotor hub section, while eliminating the spherical shape or a conventional joint shape.

The above and other objects of the invention are achieved by a spring element for connecting two components, essentially with the same direction of extension, whereby one component is fixed relative to the other component, and said component has angle of rotation mobility relative to the fixed component, comprising a T-shaped section in the component extension direction, having a sectional segment on the end of the section having a connecting means for the component with angle of rotation mobility and having a section base having torsional flexibility and having connecting means for the fixed component, which are limited to both ends of the base.

According to the invention, the spring element is developed for a specific arrangement between the components, such that it not only has the rigidity required to fulfill its supporting function relative to the component with angle of rotation mobility, but at the same time is effective as a torsion bearing of the same. This means, it enables angle of rotation movements of this component relative to the fixed component. In this connection, the profile segment acts as a lever arm, which can swivel as a result of the component with angle of rotation mobility and which, when adjusted for angularity, subjects the section base to torsional stress between both connecting means (for the fixed component).

In addition to this, the spring element has the considerable advantage, according to the invention, in the application mentioned above, which concerns supporting a blade control casing, that,, according to a preferred embodiment, its rigidity in flapwise and chordwise direction can be variably adjusted by selecting the angle between the profile sides (plates) accordingly. One makes this adjustment when designing the spring element, according to the bearing pressure of the component "blade control, casing" with angle of rotation mobility (by means of the pitch angle control element have greater rigidity in the flapwise direction of blade can be fulfilled with a relatively small side angle.

Finally, with relatively modest constructional expenditure, the invention is especially advantageous for structures made of fiber-reinforced plastic.

BRIEF DESCRIPTION OF THE DRAWING

The invention will be described in greater detail in the following detailed description with reference to the single drawing figure which shows a spring element, in accordance with the invention.

DETAILED DESCRIPTION

In the following, the invention is clarified based on an exemplified embodiment, which refers to the drawing. In a perspective view, this drawing illustrates the spring element, according to the invention, as a brace 1 between a blade root 2 of a not further represented rotor blade (inter alia known from German Pat. No. 32 41-754) and its blade control casing 3 for adjusting the blade pitch angle by means of a steering rod 4. In this connection, the spring element brace 1 not only has a supporting function for the blade control casing 3, but also assumes the function of a torsion bearing, so that the blade control casing 3 can perform angle of rotation movements relative to the blade root 2, which is fixed relative to this casing. To fulfill this double function, the brace 1 has a T-shaped section in the extension direction of the (both components) blade root 2 and the blade control casing 3, with a section base 1.1, which has torsional flexibility and whose width b (in the extension direction of the component) is preferably greater than the height h of the sectional segment 1.2, which is therefore relatively stiff compared to the section base 1.1. The sectional segment 1.2 at the end thereof is provided with a connecting means 1.3 for the blade control casing 3, and the section base 1.1 on the base ends is provided with connection means 1.4 for the blade root 2, so that the connection of the section base 1.1 with the blade root 2 is limited to both of its base ends. Accordingly, the section base 1.1 can be subjected to torsional stress, as soon, as the, sectional segment 1.2 is tilted as a result of pitch angle movements of the blade control casing 3.

As the drawing clarifies further, the spring element brace 1 consists preferably of two plates 1' with torsional and bending flexibility, which respectively have the shape of the T-section and, in the composite construction in the direction of the blade depth or in the cross direction of the component, form a V-section with its profile side clearing the profile root 1.5 assigned to the fixed component blade root 2, such that the axes of the profile side intersect in the axis of rotation 5 of the component with angle of rotation mobility blade control casing 3. This configuration has the already mentioned advantage that the rigidity of the spring element brace 1 is adjustable in accordance with the application by way of the angle between both plates 1'.

As a result of the selected plate composite construction, finally a simpler design of the spring element brace 1 is also guaranteed, which is especially suited for a construction of fiber-reinforced plastic, which, for example, can be joined with the components to be connected through a simple adhesion. All that is required is uniting the blade spring plates 1' by way of the connecting means 1.3, 1.4, which thereby can be composed of the fixing brackets bent on the three ends of the T-section of the individual plate 1' and of the connecting brackets coupling these fixing brackets respectively.

Accordingly, the spring element is a subassembly, which is finished before installation and which, in the preferred fiber-reinforced plastic construction, is maintenance-free and designed for nearly an unlimited lifetime.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A spring element for connecting first and second components, the two components having substantially the same direction of extension, with the first component being fixed relative to the second component, the second component being angularly movable relative to the first component, the spring element comprising a T-shaped sectional piece extending in the direction of extension of the components, the T-shaped sectional piece comprising a base section extending in the direction of extension and a section extending substantially perpendicularly from the base section to form the T-shaped sectional piece, the section extending substantially perpendicularly from the base section having a first connecting means for connecting the section extending substantially perpendicularly from the base section to the second component, and the base section having torsional flexibility and further comprising a connecting means disposed at each end of the base section for connecting the base section to the first component.

2. The spring element recited in claim 1, wherein said base section has a width and said section extending substantially perpendicularly from said base section has a height, with the width of said base section being greater than the height of said section extending substantially perpendicularly from the base section.

3. The spring element recited in claim 1, wherein the second component has an axis of rotation, the spring element has a composite construction having at least two T-shaped plates disposed adjacently having torsional and bending flexibility, said two T-shaped plates being disposed such that in a cross section, said two T-shaped plates have a V-shaped section, with the V-shaped section having two legs in cross section formed by the T-shaped plates such that axes of the legs in cross section intersect in the axis of rotation of the second component.

4. The spring element recited in claim 3, wherein the two T-shaped plates comprise flat springs made of fiber-reinforced plastic.

5. The spring element recited in claim 3, wherein the T-shaped plates are joined together by each of the connecting means such that the base sections of each of the T-shaped plates are joined together at ends thereof by a connecting means connecting the base sections to the first component and the sections extending substantially perpendicularly from the base sections are connected together by the connecting means connecting the sections extending substantially perpendicularly from the base sections to the second component.

* * * * *

UNITED STATES PATENT AND TRADEMARK OFFICE
CERTIFICATE OF CORRECTION

PATENT NO. : 4,988,084

DATED : January 29, 1991

INVENTOR(S) : Alois Wagner et al

It is certified that error appears in the above-identified patent and that said Letters Patent is hereby corrected as shown below:

Column 1, line 68, change "pitch angle control element..." to read --pitch angle control for the blade). For example, the requirement that the spring element...--

Signed and Sealed this

First Day of September, 1992

Attest:

DOUGLAS B. COMER

*Attesting Officer*   Acting Commissioner of Patents and Trademarks